E. G. MARQUARDT.
COMBINATION OF ELECTRIC AND GAS STOVE.
APPLICATION FILED MAR. 17, 1919.

1,358,966.

Patented Nov. 16, 1920.

2 SHEETS—SHEET 1.

INVENTOR
Evan G. Marquardt
by
Owen, Owen & Crampton

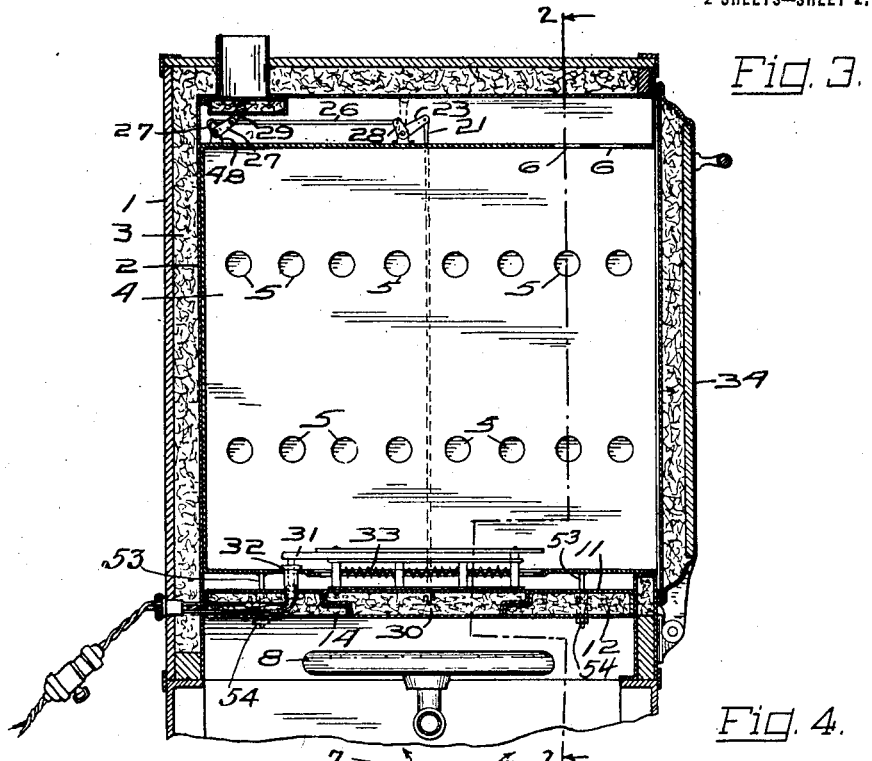
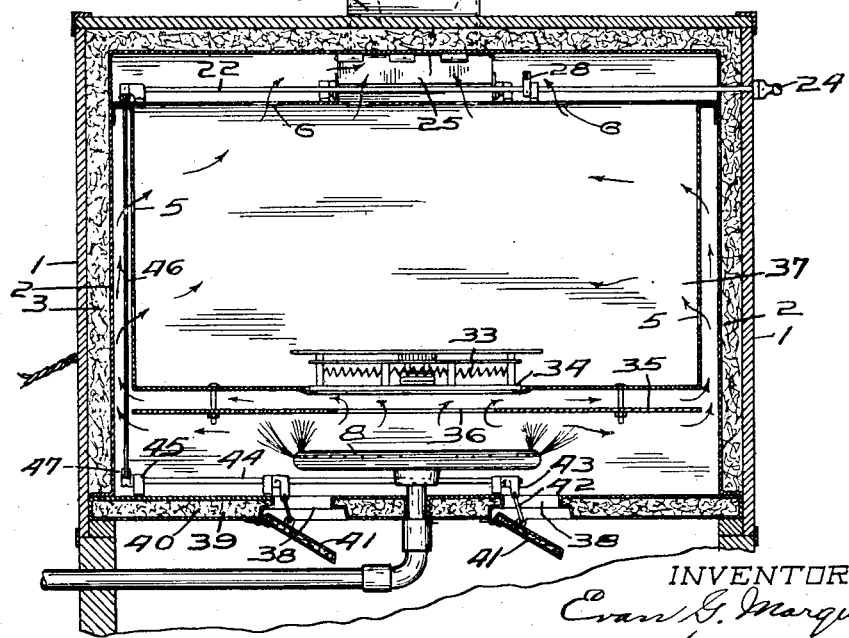

UNITED STATES PATENT OFFICE.

EVAN G. MARQUARDT, OF TOLEDO, OHIO.

COMBINATION OF ELECTRIC AND GAS STOVE.

1,358,966.  Specification of Letters Patent.  Patented Nov. 16, 1920.

Application filed March 17, 1919. Serial No. 283,164.

*To all whom it may concern:*

Be it known that I, EVAN G. MARQUARDT, a citizen of the United States, and a resident of Toledo, in the county of Lucas and State of Ohio, have invented a certain new and useful Combination of Electric and Gas Stoves; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide particularly an oven which may be readily modified so that it may be heated either by gas or by electricity. When the oven is heated by gas, the gas requires air for the complete combustion of the gas aside from the air that is mixed with the gas in the mixer. The air current produced by the heat of the gas flame, which coacts to prevent the combustion of the gas, is utilized for efficiently heating the oven. I thus provide a means for directing the air currents through the oven in such a way as to economize the heat and to cause efficient transmission of the heat of the air currents to the interior of the oven and yet avoiding the direct flow of the air current from the consuming gas upon articles that may be placed in the oven. I have also provided a means whereby the interior of the oven may be heated by an electric element, the oven being so constructed that it is thoroughly heat insulated when it is heated by gas and also thoroughly heat insulated when it is heated by electricity, the air passageways necessary for the gas being closed by heat insulating material or parts. Moreover the oven is so constructed that there will be the greatest possible economy of volume to be heated by the electric heat element notwithstanding the provision of the requisite passageways for the air when it is to be heated by the gas. Other advantages and features of my invention will appear from the following description and upon examination of the drawings.

The invention may be contained in ovens of different forms. For purposes of illustration I have selected one form of oven containing my invention and shall describe it hereinafter. The oven selected is illustrated in the accompanying drawings.

Figure 1:
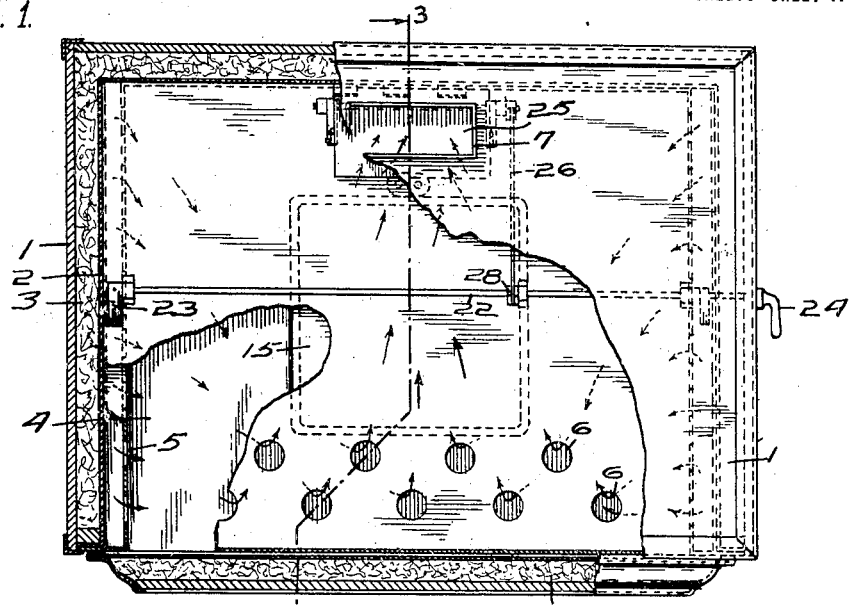
Figure 2:
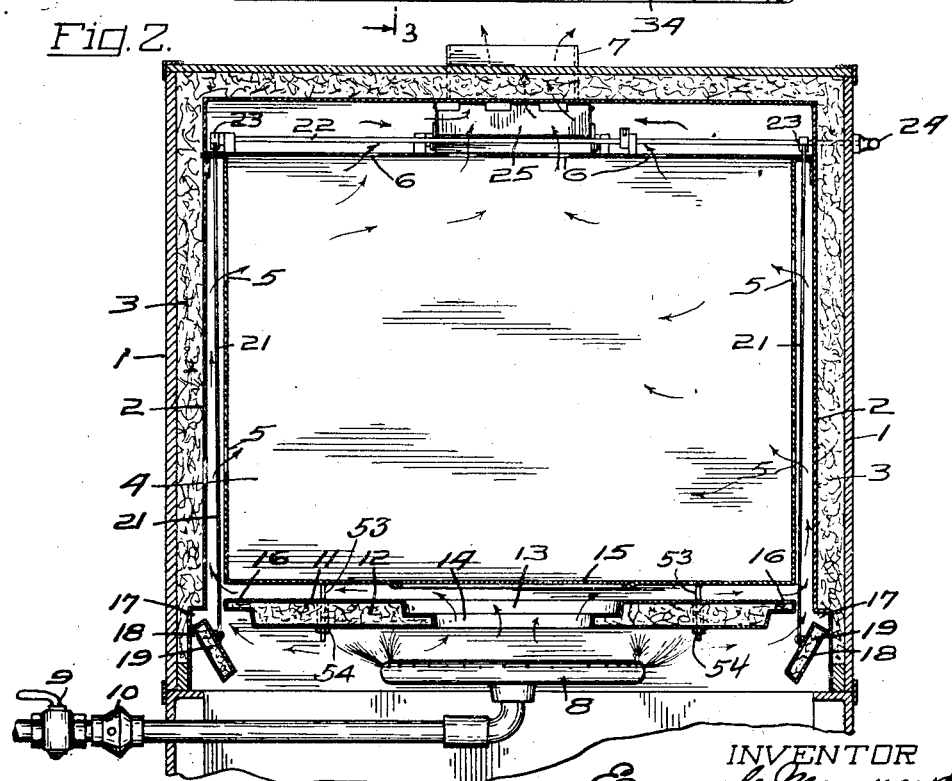

Figure 1 of the drawings illustrates a top broken view of the oven. Fig. 2 illustrates a vertical section of the oven when the same is heated by gas. It is a sectional view taken on the line 2, 2 indicated in Fig. 3 except that in Fig. 3 the electric heat element is shown in position. Fig. 3 is a sectional view taken on the line 3, 3 indicated in Fig. 1 except that in Fig. 1 the parts of the oven are in position to be heated by gas, while in Fig. 3 the heat element is in position for heating the oven by electricity. Fig. 4 is a sectional view showing a modified construction wherein both the gas and the heat element are in position for heating the oven, the heat oven being protected by a suitable plate from the flames of the gas burner.

1, in the figures, indicates the outer wall and 2 indicates the inner wall of the oven. The space between the walls may be filled with suitable heat insulating material 3, such as asbestos, fiber or the like. Within the walls is located the oven 4 which may be spaced from the wall 2, particularly the sides of the inner wall 2, to allow air currents to rise between the oven and the inner wall 2 and enter openings 5 that may be distributed over the sides of the oven, and pass out through openings 6 that may be located in the top of the oven and distributed particularly near the forward edge of the top of the oven and pass rearwardly and out through the exit 7 that may lead to the chimney when the oven is heated by gas. 8 is the gas burner which is connected with a suitable source of gas supply and the gas is controlled by means of a suitable gas cock 9. A suitable mixer 10 is also provided for mixing the gas with air. Above the burner 8 is located a wall 11 having a suitable heat insulating material 12. The wall 11 is connected to the bottom of the oven 4 by means of the bolts 53 and nuts 54. The wall 11 may thus be adjusted in its spaced relation with respect to the bottom of the oven. If the wall 11 is raised it decreases the amount of heat that passes through the bottom of the oven while if it is lowered it increases the amount of heat since it correspondingly decreases or increases the volume between the bottom of the oven and the wall 11. By this arrangement the uniformity of the heat entering the bottom and the side walls of the oven may be regulated so as to produce uniformity of heat around the oven. The interposition of the insulating wall 11 between the burner 8 and the oven reduces the local intensity of the heat from the burner and by reason of its adjustability controls the amount of heat that passes through the bottom of the oven and the side of the oven. This localization of the heat on the bottom of the oven is not only controlled but is entirely avoided. The wall 11 is provided with an opening 13 and a flange 14 which extends inwardly with respect to the opening 13. Above the opening 13 is located a removable plate 15 that closes the oven proper at that point and causes the air currents that rise by reason of the heat of the gas burner through the opening 13, to be directed between the wall 11 and the bottom of the oven and pass to the sides of the oven, and upward between the oven and the wall 2. The side edges of the wall 11 are slightly spaced from the sides of the wall 2 and the heated air may pass along the lower side of the wall 11 and directly to the spaces between the sides of the oven proper and the wall 2. The wall 11 is also provided with the flanges 16 and the wall 2 may be indented along its lower side edges at 17 and heat insulating doors or traps 18 made hollow and filled with heat insulating material 19 may be hinged below the flanges 16 and the shoulders formed by the indentations 17 and when the traps 18 are closed they will cut off the passageways for the air currents that pass directly from the burner to the side of the oven.

The traps or doors 18 may be connected by rods 21 to a rod or shaft 22 through arms 23. A handle 24 may be connected to the shaft 22 and when the handle 24 is rotated, the rods 21 will be lifted and thus the traps 18 will be closed. The outlet or exit 7 may also be provided with a gate or damper 25 which may also be operated by the handle 24 it being connected therewith by the rod 26 and the arms 27 and 28. The arms 27 form a bell crank lever that is pivoted on a suitable bracket 48 and are connected to the damper or gate 25 by means of a link 29. The damper or gate 25 is pivoted to the wall 22 and when the lever is moved the gate or damper will be opened or closed. By this arrangement the gate or damper 25 will be closed at the same time that the gates or traps 18 are closed and will be opened at the same time that the traps or gates 18 are opened. The passageways are thus closed when the oven is to be heated by electricity.

The heat element is provided with a heat insulating body 30 that may be formed in substantially the same way that the wall 11 is formed and so as to fit the opening 13 and the flange 14. The heat element may be mounted on the heat insulating wall or body 30. It may be provided with conductors 31 that set into sockets 32 that are connected with a source of current supply when the wall 30 is placed in position in the opening 13, the plate 15 having been removed. The oven is thus entirely inclosed within heat insulating walls and the heat produced by the heat element 33 will be economized, the oven being completely closed by the heat insulating material located between the surrounding walls and within the door 34 and all possibility of air escape or circulation being prevented by the closing of the traps or gates 18 and of the damper or gate 25.

In the form of the invention illustrated in Fig. 4, the heat element 33 is located permanently within the oven it being supported on a plate 34 that takes the place of the plate 15 and the air and the direct heat raised from the burner being deflected thereby. A plate 35 having an opening 36 is located intermediate the burner and the oven 37. The side edges of the plate 35 are located in spaced relation with reference to the inner wall 2 so as to permit the air currents to pass through the opening 36 and around the side edges of the plate 35 to and between the sides of the oven and the inner wall 2. The air then passes through the openings in the sides and in the top of the oven as in the form of the invention illustrated in Figs. 1 and 2. The air is permitted to pass to the burner through openings 38 located in the bottom wall 39 which is also provided with the heat insulating material 40. The openings 38 in the wall 39 may be closed with the gates or traps 41 which are hinged to the wall 39 and are connected by links 42 to arms 43 located on a rod 44. The rod 44 may be supported in suitable brackets 45 located on the wall 39 and may be connected to a rod 46 through an arm 47. The rod 46 may be connected to the rod or shaft 22 provided with the handle 24 which when rotated will cause the rotation of the rod or shaft 44 and will close or open the traps or gates 41 and thus close or open the openings 38. The exit 7 may also be closed by a damper 25 which is also connected to the rod or shaft 22 in the same way that it is operated in the form of the invention illustrated in Figs. 1, 2 and 3. By rotation of the handle 24 the oven will thus be converted from a gas heating oven to an electric heating oven.

I claim—

1. In a stove having insulating side and top walls, an oven located in the stove, the walls of the oven being located in spaced relation with respect to the side and top walls of the stove, an insulating wall located in spaced relation with respect to the bottom of the oven and its edges in spaced relation with side walls of the stove and having an opening, a burner located on the outside of the opening and adapted to direct its flames away from the opening, and means for adjusting the last named wall with respect to the bottom of the oven.

2. In a stove having insulating side and top walls, an oven located in the stove, the walls of the oven being located in spaced relation with respect to the side and top walls of the stove, an insulating wall located in spaced relation with respect to the bottom of the oven and its edges in spaced relation with side walls of the stove and having an opening, a burner located on the outside of the opening and adapted to direct its flames away from the opening, means for adjusting the last named wall with respect to the bottom of the oven, and dampers having heat insulating material for closing the space between the edges of the last named wall and the side walls of the stove.

3. In a combined electric and gas stove having insulating walls, an oven having walls located in spaced relation with respect to the walls of the stove, an insulating wall located in spaced relation with respect to the bottom of the oven and its edges in spaced relation with respect to walls of the stove and having a central opening, dampers having heat insulating material for opening and closing the spaces between the edges of the last named wall and the walls of the stove, a gas burner located beneath for directing a flame from the center of the opening, an electric heater having a base containing heat insulating material for fitting the opening in the last named heat insulating wall.

In testimony whereof I have hereunto signed my name to this specification.

EVAN G. MARQUARDT.